(12) United States Patent
Glinsky et al.

(10) Patent No.: US 7,519,477 B2
(45) Date of Patent: Apr. 14, 2009

(54) METHOD FOR DETERMINING IMPEDANCE COEFFICIENTS OF A SEISMIC TRACE

(75) Inventors: Michael Edwin Glinsky, Houston, TX (US); Jerome Kalifa, Paris (FR); Stephane Mallat, Paris (FR)

(73) Assignee: BHP Billiton Innovation Pty Ltd., Melbourne, Victoria (AU)

( * ) Notice: Subject to any disclaimer, the term of this patent is extended or adjusted under 35 U.S.C. 154(b) by 19 days.

(21) Appl. No.: 11/584,316

(22) Filed: Oct. 20, 2006

(65) Prior Publication Data

US 2008/0097702 A1 Apr. 24, 2008

(51) Int. Cl.
*G06F 19/00* (2006.01)
(52) U.S. Cl. ........................................................ 702/17
(58) Field of Classification Search .................... 702/17, 702/14, 182–185, 188
See application file for complete search history.

(56) References Cited

U.S. PATENT DOCUMENTS 5,671,136 A * 9/1997 Willhoit, Jr. ................. 702/18

* cited by examiner

*Primary Examiner*—Edward Raymond
(74) *Attorney, Agent, or Firm*—Koppel, Patrick, Heybl & Dawson

(57) ABSTRACT

A method for determining impedance coefficients of a seismic trace comprises determining reflection coefficients of the seismic trace, for example using a sparse spike inversion, integrating the reflection coefficients with respect to time to obtain impedance coefficients, and filtering the impedance coefficients by applying a low-cut window filter. The window size and/or shape may be defined by a variable parameter which may be either specified by a user or optimized on the basis of a lateral variability parameter calculated for different values of the window parameter.

16 Claims, 17 Drawing Sheets
(3 of 17 Drawing Sheet(s) Filed in Color)

METHOD FOR DETERMINING IMPEDANCE COEFFICIENTS OF A SEISMIC TRACE

BACKGROUND OF THE INVENTION

1. Field of the Invention

The present invention relates to the general area of the analysis and interpretation of subsurface regions on the basis of seismic data, and in particular to improving the modelling of subsurface regions by improving the determination of the impedance coefficients of a seismic trace.

2. Description of the Related Art

When appraising or developing an oil or gas field, it is well known to use seismic data to provide information regarding the subsurface region, which can provide information about the presence, location, size, etc, of potential petroleum reservoirs, on the basis of the reflection characteristics of incident waves. Therefore, an analysis or modelling of the structure and properties of the subsurface region is important in making drilling decisions, and a reduction in the uncertainty of such analysis or modelling is particularly advantageous in improving decision making.

Impedance coefficients of a seismic trace are commonly computed with an integration in time of reflection coefficients, wherein the reflection coefficients are themselves usually computed using a sparse spike inversion of the seismic traces.

FIGS. 1(a) to 1(c) show an example of a 1D seismic trace inverted with a sparse spike inversion procedure, and the corresponding impedance coefficients. More particularly, FIG. 1(a) shows a 1D seismic trace, FIG. 1(b) shows corresponding reflection coefficients after a sparse spike inversion, and FIG. 1(c) shows impedance coefficients after an integration in time of the reflection coefficients.

Here, reflection coefficients are sparse spike signals. Since each 1D seismic trace is processed independently from other traces in most sparse spike inversion techniques, the amplitude of the spikes at the same time locations can vary significantly from one trace of reflection coefficients to its immediate neighbors. For example, if two neighboring traces of reflection coefficients computed with a sparse spike inversion are superimposed, the spikes would tend to be at similar time locations, but their amplitudes can vary significantly from one trace to the other.

The corresponding impedance coefficients computed with an integration of the reflection coefficients are piece-wise constant signals, however the value of the constants are very different on a same segment from one trace to another. This is illustrated for 1D signals by FIG. 2, which shows a superimposition of two neighboring traces ('Trace 1' and 'Trace 2') of impedance coefficients computed with an integration in time of the corresponding neighboring reflection coefficient traces. It can be seen that both signals have very different constant values on each constant segment.

This effect is particularly visible on 2D images of impedance coefficients. FIG. 3(a) shows a 2D image of impedance coefficients from a first dataset ('the Cyclone dataset'), where the impedance coefficients were integrated from reflection coefficients computed using a sparse spike inversion. The horizontal direction is crossline, and the vertical direction is time. The differences in the coefficients from one trace to another (as represented by the brutal changes in tone in FIG. 3(a)) are artifacts and have no geophysical justifications. To remove these artifacts, the lowest frequencies of impedance coefficients in the time direction should be suppressed or attenuated. This is usually done by filtering low frequencies with a simple low-cut filter, typically at around 1 Hz. However, some important lower frequencies may be lost using this conventional technique, and it is therefore desirable to provide a filtering technique which removes artefacts whilst retaining more information from the lower frequencies, in order to provide an improved determination of impedance coefficients.

SUMMARY OF THE INVENTION

A method is disclosed for determining improved impedance coefficients of a seismic trace, compared with the conventional low-cut filtering technique, by using a more adaptive approach. In one embodiment, the method comprises the steps of determining reflection coefficients of the seismic trace, integrating the reflection coefficients with respect to time, to obtain impedance coefficients, and filtering the impedance coefficients by applying a low-cut window filter.

Preferably, the window size of the filter is defined by a user selectable parameter, and the method further comprises the step of selection of the parameter by the user. The user selectable parameter may be the support size of the window, and preferably only a single window size parameter is selectable by the user. Preferably, the window filter comprises a triangular window.

In one embodiment, the size and/or shape of the window function is optimised, and in a further embodiment the size of the window is automatically adapted to a given dataset, without user intervention.

In particular, in one embodiment, the method comprises the steps of:
(a) determining reflection coefficients of each seismic trace;
(b) integrating the reflection coefficients with respect to time, to obtain impedance coefficients of the plurality of seismic traces across the region;
(c) filtering the impedance coefficients by applying a low-cut window filter having at least one variable window parameter defining the size and/or shape of the window filter;
(d) calculating a lateral variability parameter of the filtered impedance coefficients representing the variability of the filtered impedance coefficients between seismic traces;
(e) repeating steps (c) and (d) using different values of the at least one variable window parameter;
(f) selecting a value of the at least one variable window parameter based on the lateral variability parameters calculated in step (d); and
(g) selecting the filtered impedance coefficients obtained in step (c) using the selected value of the at least one variable window parameter.

In another embodiment, a method for improving modelling of a subsurface region using a plurality of seismic traces from across the region, comprises the steps of:
(i) dividing the seismic traces into a plurality of sets of adjacent seismic traces;
(ii) for a first set of seismic traces, carrying out the steps of:
  (a) determining reflection coefficients of each seismic trace in the set;
  (b) integrating the reflection coefficients with respect to time, to obtain impedance coefficients of the plurality of seismic traces of the set;
  (c) filtering the impedance coefficients by applying a low-cut window filter having at least one variable window parameter defining the size and/or shape of the window filter;

(d) calculating a lateral variability parameter of the filtered impedance coefficients representing the variability of the filtered impedance coefficients between seismic traces of the set;

(e) repeating steps (c) and (d) using different values of the at least one variable window parameter;

(f) selecting a value of the at least one variable window parameter based on the lateral variability parameters calculated in step (d); and (g) modelling the subsurface region corresponding to the set of seismic traces on the basis of the filtered impedance coefficients obtained in step (c) using the selected value of the at least one variable window parameter.

This embodiment optionally further comprises the step of, for each of the remaining sets of seismic traces, carrying out steps (a) to (c) and (g), using the value of the at least one variable window parameter selected in step (f) for the first set of seismic traces. Alternatively, steps (a) to (g) may be carried out for each of the remaining sets of adjacent seismic traces.

The above methods may also be implemented in the form of a computer program.

BRIEF DESCRIPTION OF THE DRAWINGS

The patent or application file contains at least one drawing executed in color. Copies of this patent or patent application publication with color drawings will be provided by the Office upon request and payment of the necessary fee.

Further embodiments, advantages, features and details of the invention will be set out in the following description with reference to the drawings, in which.

DETAILED DESCRIPTION

Figures 1A, 1B, 1C:
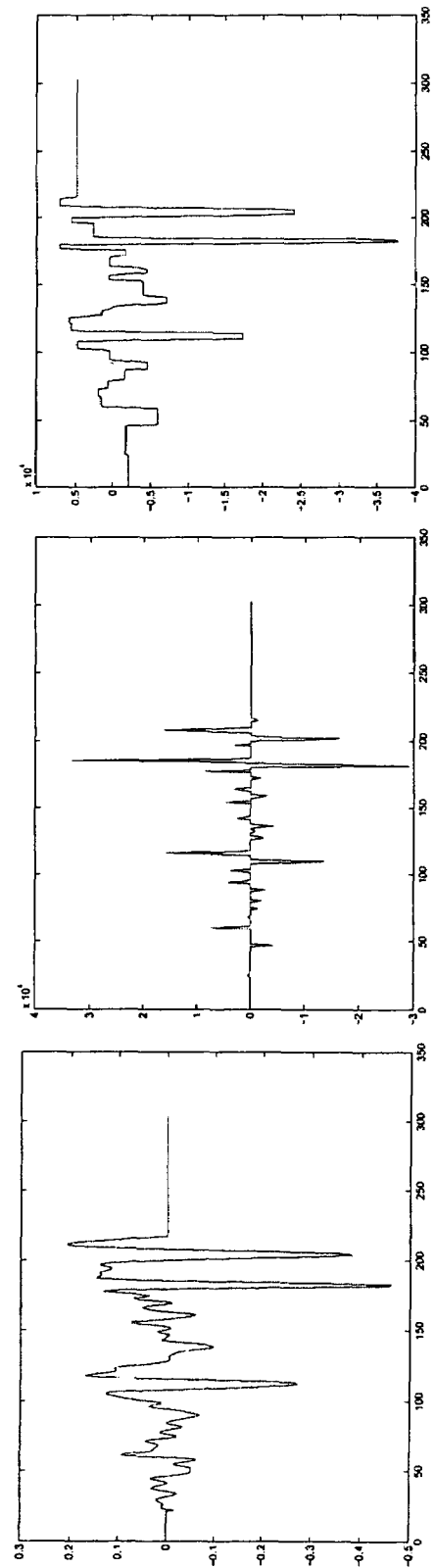
FIG. 1(a) shows a 1D seismic trace.
FIG. 1(b) shows corresponding reflection coefficients after a sparse spike inversion.
FIG. 1(c) shows impedance coefficients after an integration in time of the reflection coefficients.
Figure 2:
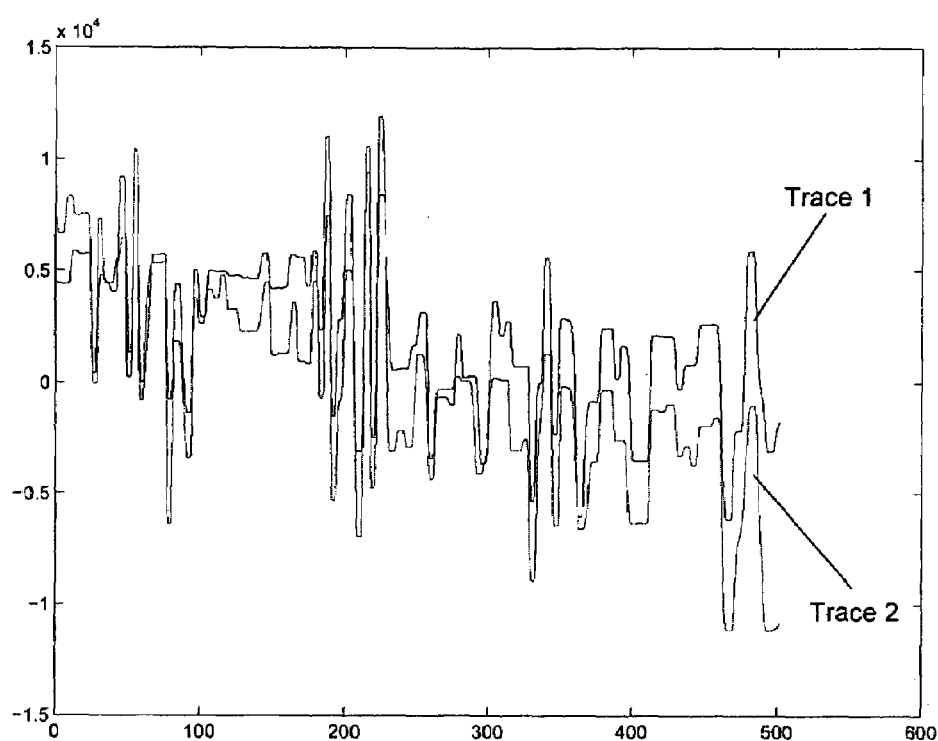
FIG. 2 shows a superimposition of two neighboring traces of impedance coefficients computed with an integration in time of the corresponding neighboring reflection coefficient traces.

The present invention relates to the development of a low-cut window filtering technique to attenuate the lowest frequencies of impedance coefficients, and is described in more detail as follows. The disclosure and description of the invention in the drawings and in this description are illustrative and explanatory thereof, and various changes may be made to the described details without departing from the scope of the invention.

Figure 14:
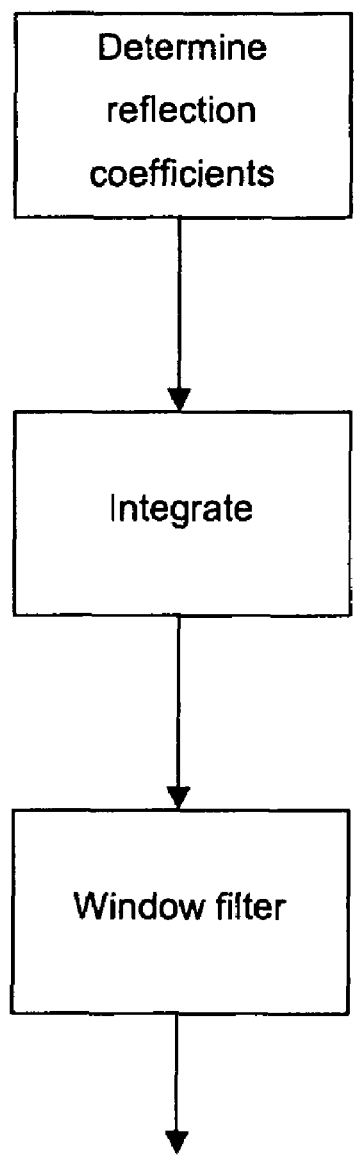
FIG. 14 is a flow chart illustrating schematically the method of a first embodiment.

The flow chart of FIG. 14 illustrates schematically in simple terms the method of a first embodiment. First, reflection coefficients of a seismic trace are determined, and they are then integrated with respect to time, to obtain impedance coefficients. Finally, the impedance coefficients are filtered by applying a low-cut window filter, to obtain improved impedance coefficients.

Let $I_{SS}$ be the impedance coefficients obtained with a time integration of the reflection coefficients $R_{SS}$ resulting, for example, from a sparse spike inversion procedure:

$$I_{SS}(t) = \int_{t_0}^{t} R_{SS}(\tau) d\tau. \tag{1}$$

The processed impedance coefficients $\tilde{I}_{SS}$ obtained after a low-cut window filtering are computed as the difference between the initial impedance coefficients $I_{SS}$ and the same impedance coefficients filtered with a low-pass window W:

$$\tilde{I}_{SS}(t) = I_{SS}(t) - I_{SS} * W(t). \tag{2}$$

Figure 3A:
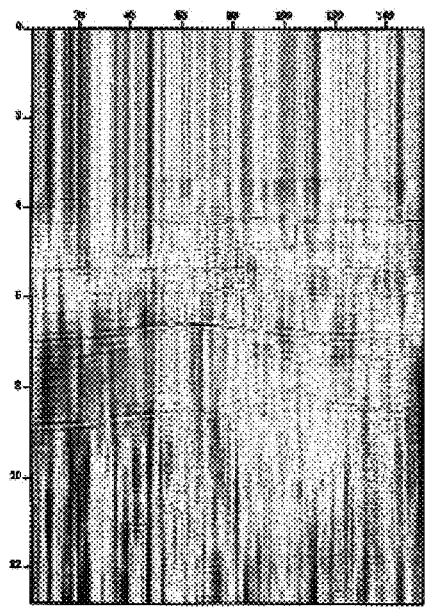
FIG. 3(a) is a 2D plot of impedance coefficients obtained with an integration of reflection coefficients using a conventional filtering technique.
Figure 3B:
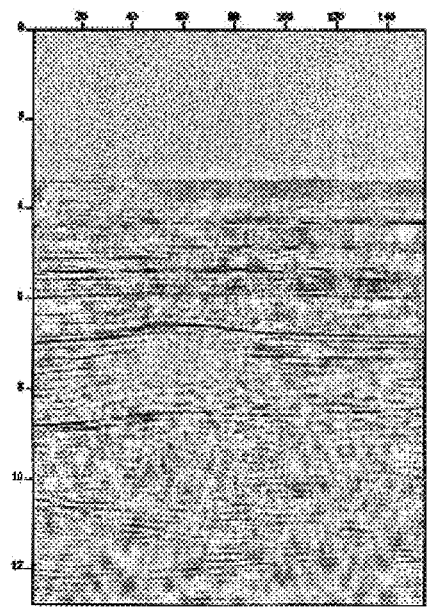
FIG. 3(b) is a corresponding plot but using a rectangle window filtering in accordance with one embodiment of the invention.

In a version of the first embodiment, W(t) is chosen as a rectangle window, and its size may be a user parameter. Numerical results are illustrated by FIGS. 3(a) and 3(b), which are 2D plots of the impedance coefficients obtained by integrating the reflection coefficients. The Horizontal direction is crossline, and the vertical direction is time.

FIG. 3(a) shows the coefficients $I_{SS}$ without window filtering, whereas FIG. 3(b) shows the coefficients $\tilde{I}_{SS}$ obtained after a rectangle window filtering in accordance with the present embodiment, with the rectangular window support size equal to 1 second. It can be seen that the vertical artifacts have practically disappeared in FIG. 3(b).

However, while this embodiment provides a good result, the rectangle shape of the window W(t) is a priori not optimal and can be further improved. The optimization of the shape of the window in accordance with a further embodiment will now be described.

Figure 4A:
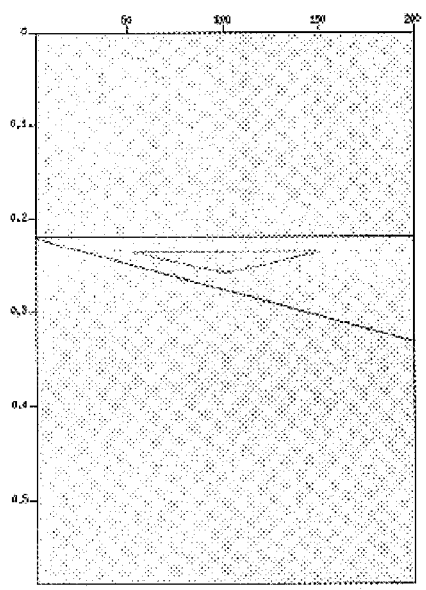
FIG. 4(a) shows reflection coefficients and FIG. 4(b) shows impedance coefficients of a synthetic wedge-plug model used to demonstrate the invention.
Figure 4B:
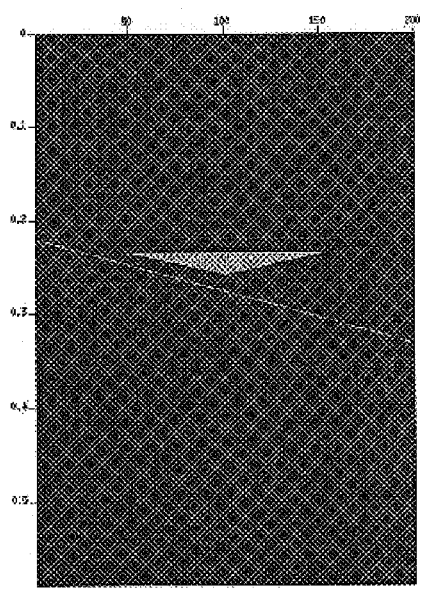

The optimization of the low frequency window filtering technique requires a quantitative criterion. FIGS. 4(a) and 4(b) show a synthetic wedge-plug model developed by BHP-Billiton, which can be used for comparisons of signal-to-noise ratios (SNR) obtained with different types of windows. FIG. 4(a) shows reflection coefficients of the synthetic wedge-plug model and FIG. 4(b) shows impedance coefficients.

Let I be the exact impedance coefficients of the synthetic wedge-plug model. In order to optimise the window, it is desirable to find the window W which maximizes the signal-to-noise ratio $SNR(I,\tilde{I}_{SS})$, where $\tilde{I}_{SS}$ is obtained with equation (2) and hence depends on the window W. The initial impedance coefficients $I_{SS}$ to be processed may be computed according to equation (1).

Optimizing the window W preferably includes the optimisation of its shape and its size, although optimising either of these parameters individually will also prove advantageous. The following description sets out the determination by the inventors of the best shape of the window W, in accordance with one embodiment. On the other hand, the size of the window can be left as a user parameter, however an automated size adaptivity technique has also been developed which will be presented as a further embodiment.

Figure 5:
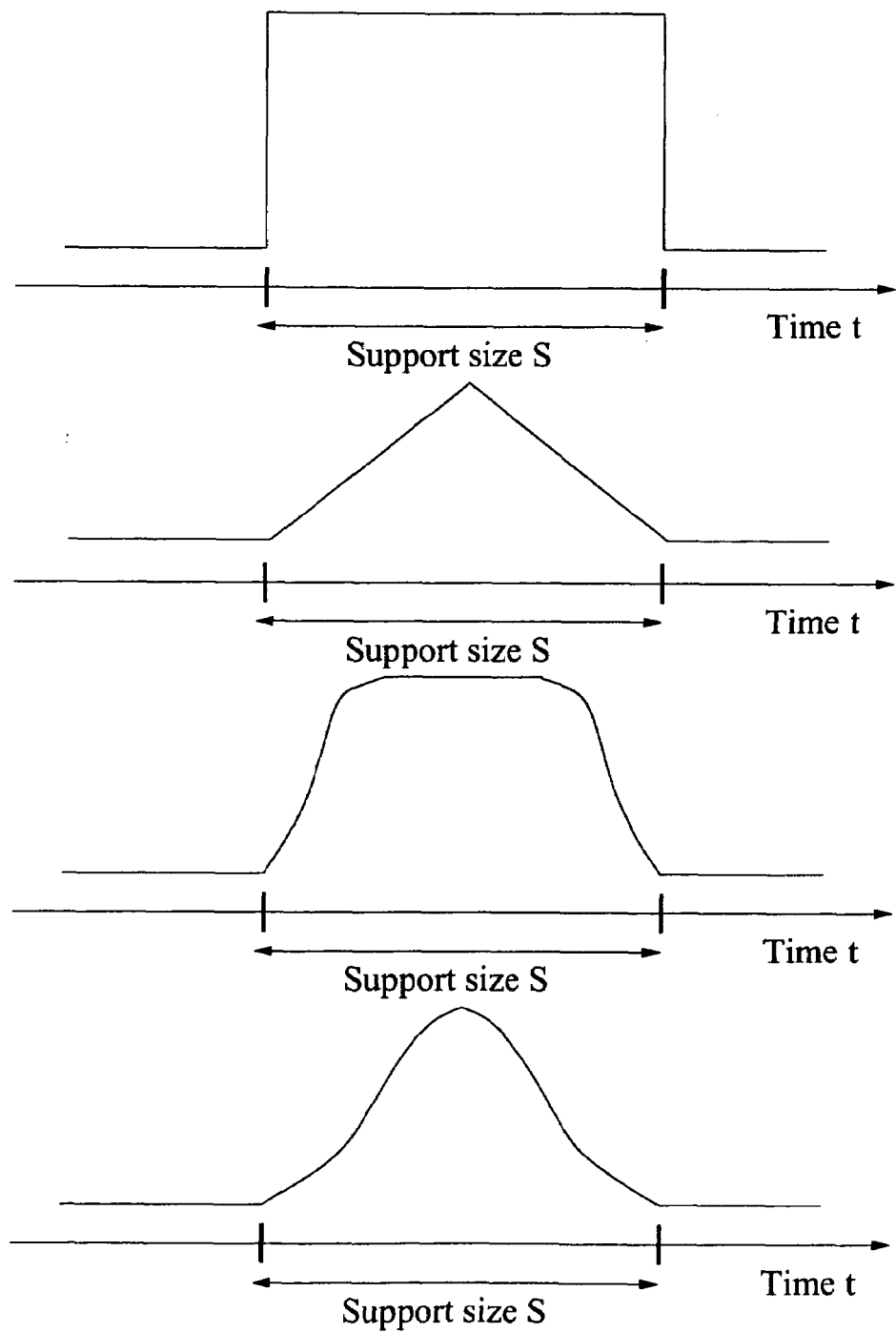
FIG. 5 illustrates examples of different shapes of sliding windows which may be used in embodiments of the invention.

Different shapes of window may be used, including triangular windows, rectangle windows, and windows with a degree of regularity which can be chosen arbitrarily. Examples are shown in FIG. 5. Windows with arbitrary regularity are computed as follows: an initial window W whose support is $[-a-\eta, a+\eta]$, whose support size S is hence equal to $S=2a+2\eta$, centered on $t=0$, is defined as:

$$W(t) = \begin{cases} 0 & \text{if } t \notin S \\ \beta\left(\frac{t+a}{\eta}\right) & \text{if } t \in O_- \\ 1 & \text{if } t \in C \\ \beta\left(\frac{a-t}{\eta}\right) & \text{if } t \in O_+ \end{cases} \quad (3)$$

Figure 6:
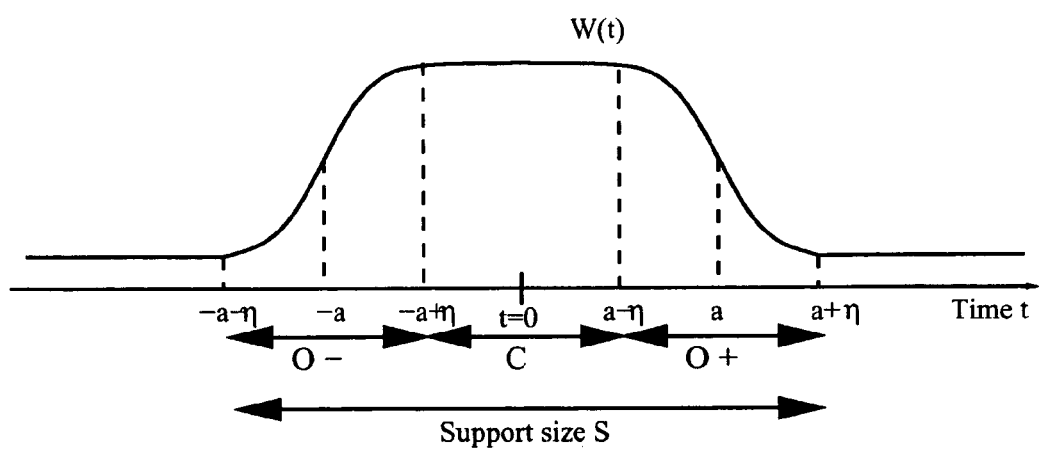
FIG. 6 illustrates the parameters of a window function W defined with equation (3) below.

FIG. 6 illustrates the role of the different segments on the window W. The regularity of the window W depends on the regularity of the profile β. β should satisfy $$\beta^2(t)+\beta^2(-t)=1 \forall t \in [-1,1]$$

as well as β(t)=0 for t<−1 and β(t)=1 for t>1. β can be chosen as a linear segment, $$\beta_l(t) = \frac{t+1}{2} \quad \forall t \in [-1, 1],$$

in which case the window W is a trapezoid (and a triangle if η=α).

Another more regular example is $$\beta_0(t) = \sin\left(\frac{\pi}{4}(1+t)\right) \quad \forall t \in [-1, 1],$$

however the derivative of $\beta_0$ in t=−1 and in t=1 is not null and hence W is not differentiable in t=−1 and in t=1. More regular windows can be constructed with a profile $\beta_k$ defined recursively for $k \geq 0$ with $$\beta_{k+1}(t) = \beta_k\left(\sin\frac{\pi t}{2}\right) \quad \forall t \in [-1, 1]. \quad (5)$$

The corresponding window W is $2^k-1$ continuously differentiable.

The value of η in equation (3) can vary from 0 to a. The window tends to a rectangle when η tends to 0, i.e. when the interval C in equation (3) tends to the complete interval $S=[-a-\eta, a+\eta]$, and the lengths of the intervals and $O_-$ and $O_+$ tend to 0. On the other hand, when η tends to a, the interval C tends to 0 and the union of the disjoint intervals $O_-$ and $O_+$ tends to $[-a-\eta, a+\eta]$, which is the complete support of the window.

Numerical experiments have been conducted by the inventors to determine the best value of η for 10 types of profiles β, including linear, and for k=1 to k=9. The best value of η which maximizes $SNR(I,\tilde{I}_{SS})$ is systematically equal to a. This corresponds to the case where the maximum slope of the window W is minimal. The definition of the window W(t) of equation (3) can thus be simplified as $$W(t) = \begin{cases} 0 & \text{if } t \notin S \\ \beta\left(\frac{t+a}{\eta}\right) & \text{if } t \in [-2a, 0] \\ \beta\left(\frac{a-t}{\eta}\right) & \text{if } t \in [0, 2a] \end{cases} \quad (6)$$

Figure 7:
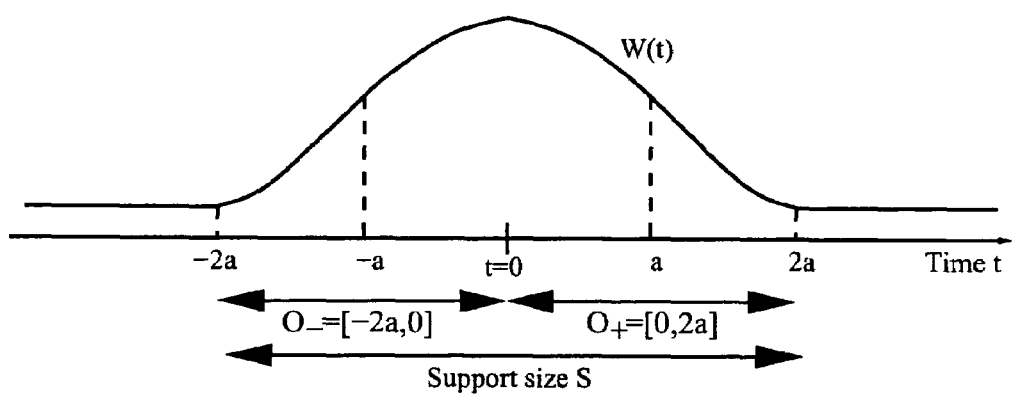
FIG. 7 illustrates the parameters of an alternative window function W defined with equation (6) below.

FIG. 7 illustrates the role of the different intervals of a window W defined with equation (6), and therefore shows the optimisation of the window of FIG. 6.

For each type of window W, the optimal size of the window was first optimized by the inventors, by hand. Table 1 shows the determined optimal sizes, which maximize the signal-to-noise ratios $SNR(I,\tilde{I}_{SS})$ resulting from the low-frequency window filtering using the rectangle window, the triangle window, and the windows defined with equation (6) for k=1 to k=9.

TABLE 1

| Profile | Optimal size S | $SNR(I, \tilde{I}_{SS})$ |
| --- | --- | --- |
| Square | 0.62 | 6.60 |
| Triangle | 1.0 | 6.99 |
| k = 1 | 0.9 | 6.89 |
| k = 2 | 0.975 | 6.86 |
| k = 3 | 1.075 | 6.79 |
| k = 4 | 1.125 | 6.72 |
| k = 5 | 1.175 | 6.67 |
| k = 6 | 1.2 | 6.63 |
| k = 7 | 1.225 | 6.62 |
| k = 8 | 1.225 | 6.61 |
| k = 9 | 1.225 | 6.60 |
| 1 Hz low-cut | | 5.58 |
| No processing | | 1.20 |

Figure 8:
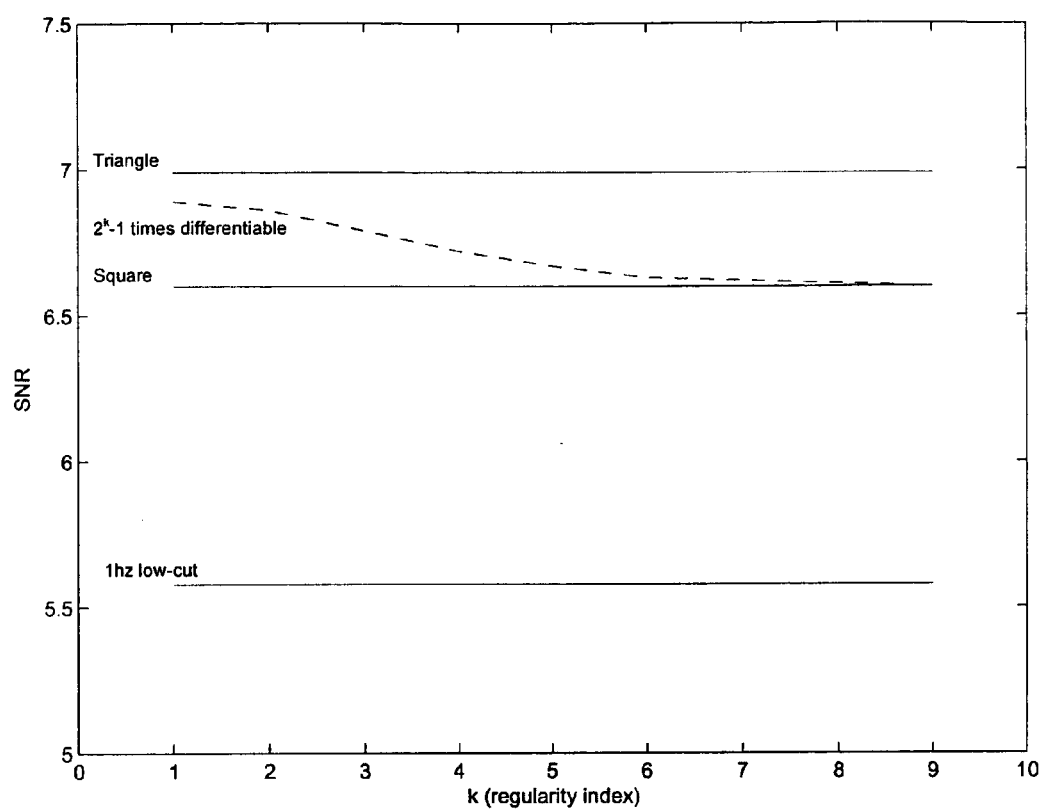
FIG. 8 shows a comparison of signal-to-noise ratios for different types of window.

Table 1 also gives the resulting signal-to-noise ratios, which are illustrated by FIG. 8. The best window, which maximizes $SNR(I,\tilde{I}_{SS})$, is the triangular window. Conversely, the results tend to decrease as k increases, and the square window is the one which provides the poorest result.

These results show that the best window is the window whose profile has the smallest maximum slope. This had already been observed above, when experimenting on the best values of η for the definition of the profile β. The slope is constant for a triangular window, which provides the best numerical results.

It should also be noted that the results obtained with a low frequency window filtering have been compared in FIG. 8 and Table 1 with the results obtained when applying a 1 Hz low-cut filter on the impedance coefficients, since this conventional technique is the most widely used for the low frequency filtering of impedance coefficients resulting from a sparse spike inversion procedure. The resulting signal-to-noise ratio is much worse than any of the numerical results obtained with any type of window.

Now that it is established that the best shape of the window is a triangle, we study the properties of the low-cut triangle window filtering depending on the support size S of the window. It was shown above that the best support size S that maximizes the signal-to-noise ratio $SNR(I,\tilde{I}_{SS})$ on the complete wedge-plug model is equal to 1 second.

Figure 10:
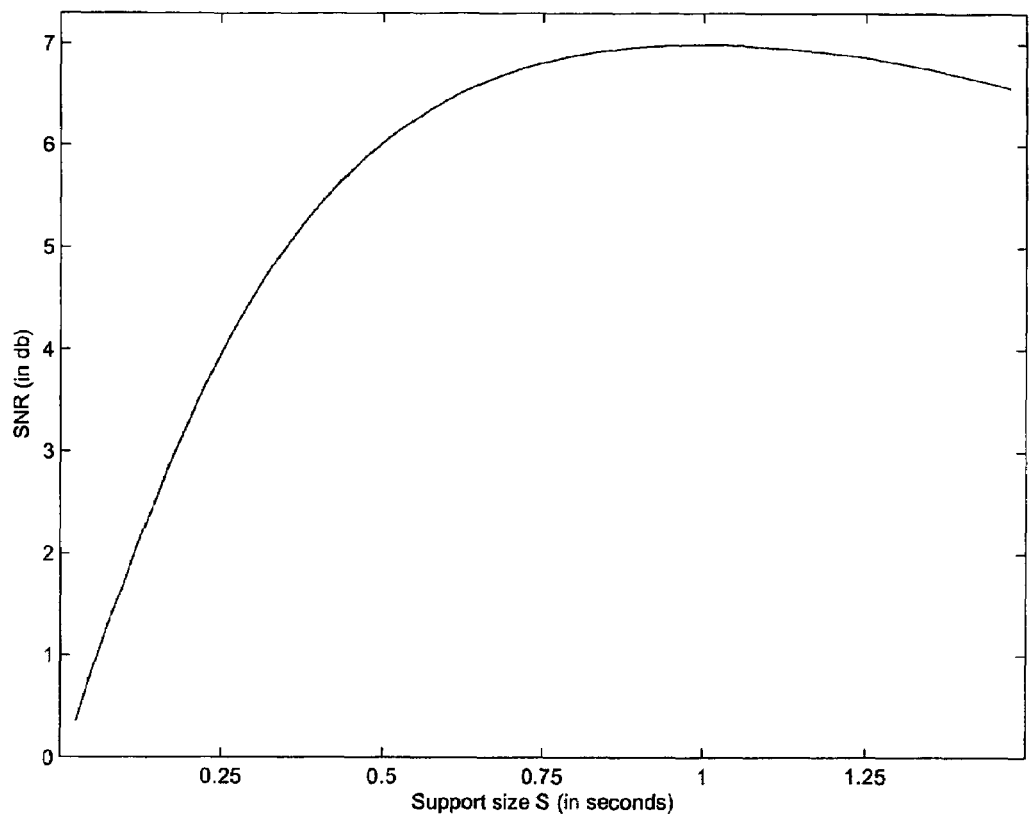
FIG. 10 shows the change in signal-to-noise ratio for the wedge-plug model depending on the support size of the triangle window.

FIG. 10 shows the evolution of $SNR(I,\tilde{I}_{SS})$ depending on the value of S for the triangle window. One observes that there exists a relatively large interval for the size S for which the performances of the filtering remain close to the optimal.

Figure 11:
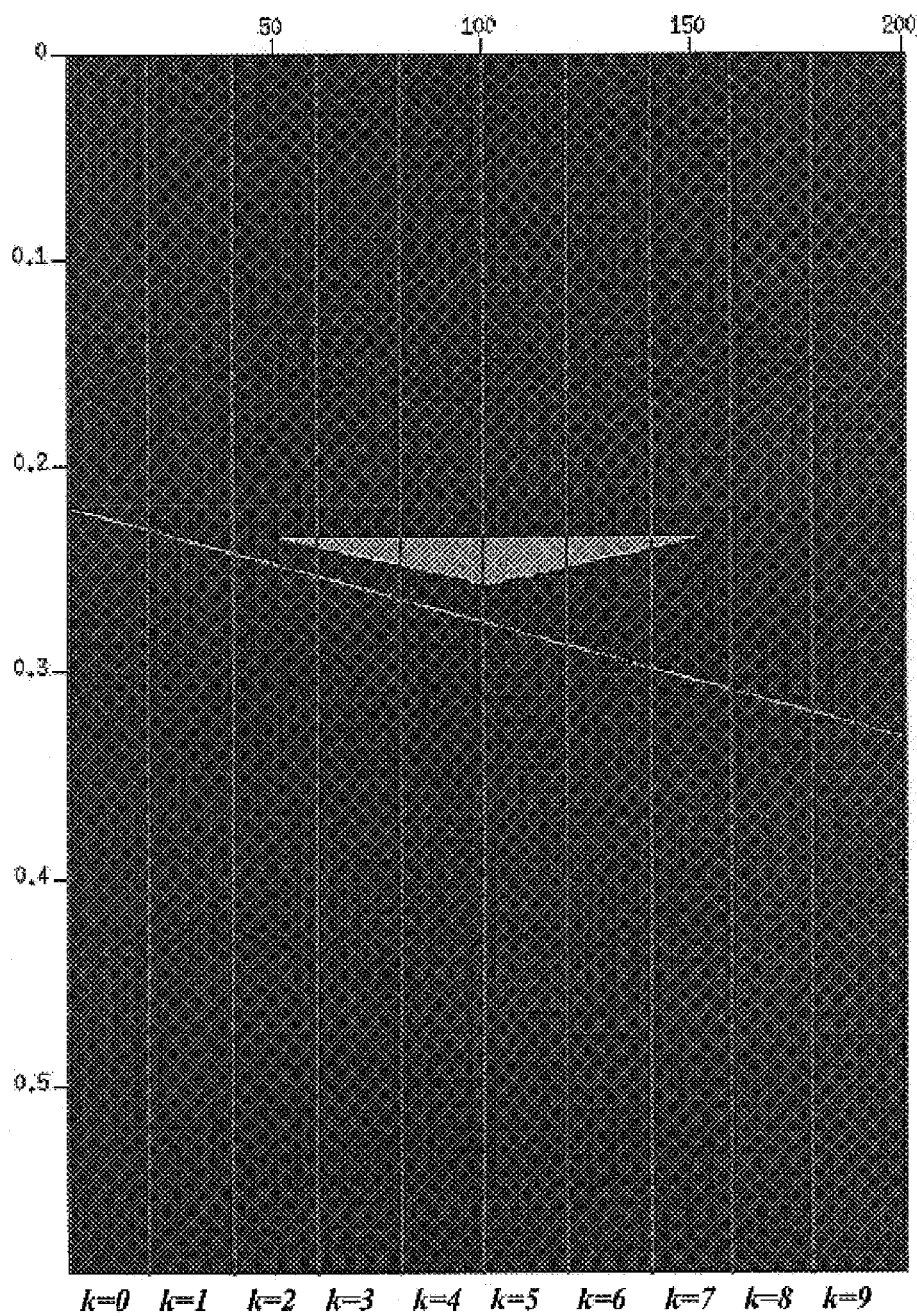
FIG. 11 shows the wedge-plug model segmented into ten parts.

The wedge-plug model is now segmented into ten parts, with different types of structures and singularities, as illustrated by FIG. 11. For each part k, with $0 \leq k \leq 9$, the signal-to-noise ratio $SNR(I^k,\tilde{I}_{SS}^k)$ was optimized independently from the other parts. Table 2 shows the best support sizes S for each part and the resulting signal-to-noise ratios, compared with the results obtained using the globally optimal size support S equal to 1 second.

is defined by a user selectable parameter, which may be selected by the user on the basis of the filtered impedance coefficients, for example by examining a plot of impedance coefficients obtained using different values of the parameter, and selecting the results which minimise artefacts. The user selectable parameter may be set at the selected value for the remainder of a given seismic dataset, or may be periodically selected by the user. In an arrangement which is particularly simple to use, but also effective, there may be provided only a single user selectable parameter, which may be a window size parameter, for example the support size of the window.

However, even for this parameter, it is possible to suppress the need for user intervention. In accordance with a further embodiment, an automated and more adaptive procedure is provided to automatically choose this support size parameter, and this embodiment is described below.

When the size S of the window support is provided as a user parameter, the user relies on a visual criterion. As illustrated by FIGS. 3(a) and 3(b), the size is chosen so that the vertical artifacts are suppressed or sufficiently attenuated. Since the user nevertheless wants to minimize the amount of filtering on the data, the chosen size is typically the maximum size for which the visual criterion is sufficiently satisfied.

A further embodiment, which will now be described, aims at automating this process, by choosing a window size S based on a lateral continuity criterion on the processed impedance coefficients.

The lateral continuity is preferably measured on a 2D image of impedance coefficients I(n,t), across the inline or across the crossline direction, where the other direction of the 2D image is the time t. To simplify the explanations, let n be the variable for the direction of lateral continuity: n=ep for the inline direction, and n=cdp for the crossline direction. The

TABLE 2

| | Index k of segment | | | | | | | | | |
|---|---|---|---|---|---|---|---|---|---|---|
| | k = 0 | k = 1 | k = 2 | k = 3 | k = 4 | k = 5 | k = 6 | k = 7 | k = 8 | k = 9 |
| Best size $S^k$ (in secs) | 0.125 | 0.4 | 0.675 | 0.4 | 0.5 | 0.7 | 1.125 | 1.425 | 1.6 | 1.6 |
| Resulting $SNR(I^k, \tilde{I}_{SS}^k)$ | 2.25 | 6.78 | 7.69 | 5.40 | 6.14 | 6.50 | 7.85 | 8.40 | 10.65 | 9.07 |
| $SNR(I^k, \tilde{I}_{SS}^k)$ for S = 1 s | −0.11 | 5.58 | 7.47 | 3.90 | 5.21 | 6.24 | 7.82 | 8.03 | 9.52 | 8.12 |

Figure 9A:
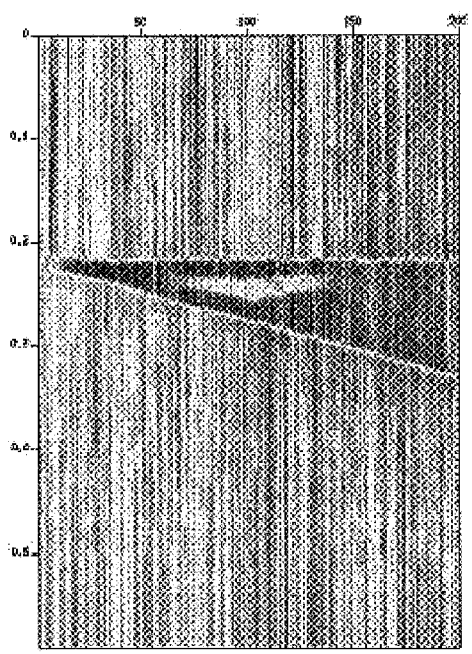
FIG. 9(a) is a 2D plot of impedance coefficients obtained with an integration of reflection coefficients with no low-frequency filtering.
Figure 9B:
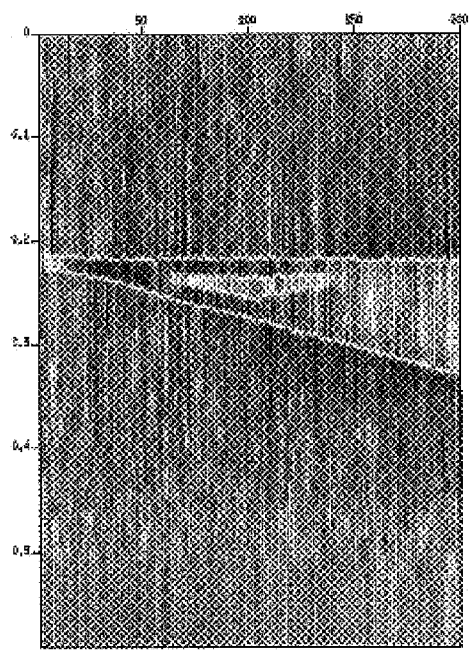
FIG. 9(b) is a corresponding plot using low-frequency triangle window filtering.

The first part of the wedge-plug model, for k=0, at the extreme left, is an exception. FIG. 9(a) is a 2D plot of impedance coefficients obtained by integration of reflection coefficients with no low-frequency filtering, and FIG. 9(b) is a corresponding plot using low-frequency triangle window filtering. As illustrated in FIGS. 9(a) and 9(b), the first part of the wedge-plug model could not be properly restored after the sparse spike inversion, because of its very fine structure. Hence the value of the signal-to-noise ratio for k=0, $SNR(I^0, \tilde{I}_{SS}^0)$, after the low-cut filtering is meaningless.

With the exception of k=0, one observes on the numerical results of table 2 that the globally optimal support size, equal to 1 second, also provides very good results, close to optimal, for each part $1 \leq k \leq 9$ of the wedge-plug model. This means that a global optimization of the support size S of the window is sufficient. This requires a single user parameter, which is chosen once and for all for a given seismic dataset.

Figure 15:
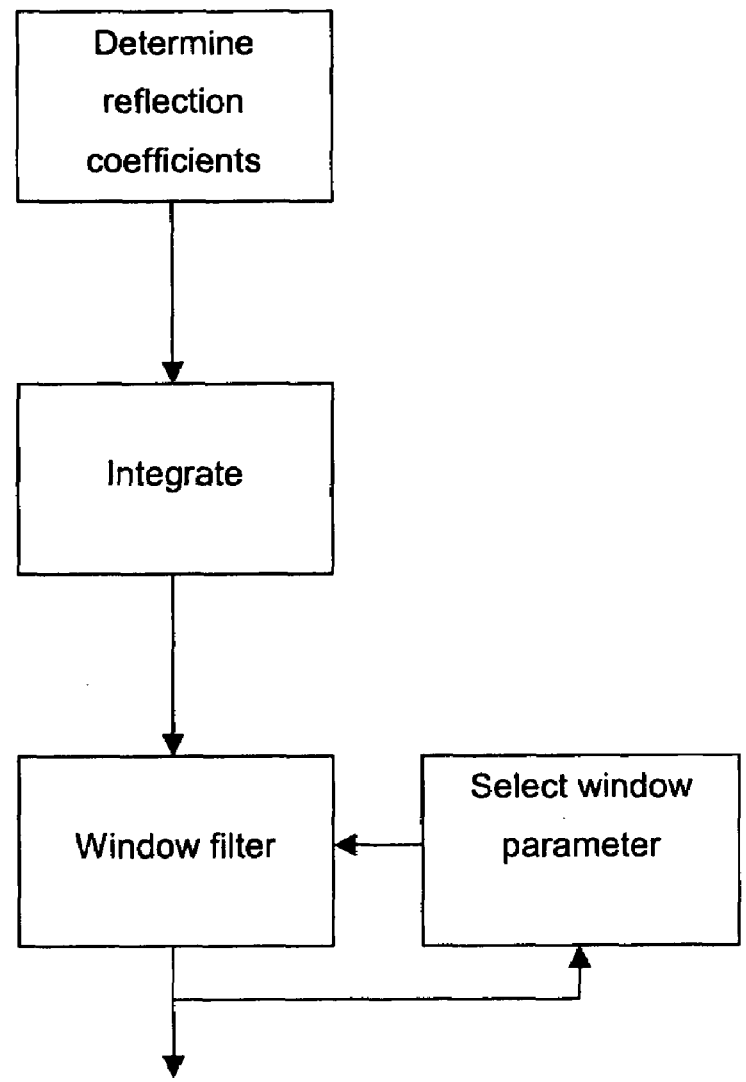
FIG. 15 is a flow chart illustrating schematically a variation of the method of FIG. 14.

The flow chart of FIG. 15 illustrates schematically a variation of the method of FIG. 14, in which the reflection coefficients are again determined and integrated to obtain impedance coefficients, the impedance coefficients being filtered by applying a low-cut window filter. In this case, the window size lateral continuity is measured as the $l^1$ norm of the derivative of the processed impedance coefficients along the direction of lateral continuity:

$$L_1(\tilde{I}_{SS}) = \sum_n \sum_t |\tilde{I}_{SS}(n+1, t) - \tilde{I}_{SS}(n, t)|. \quad (7)$$

However, it is desirable to exclude from this measure some outliers which correspond to areas of high variability of the actual impedance coefficients I. Therefore $L_1(\tilde{I}_{SS})$ is replaced with $$L(\tilde{I}_{SS}) = \sum_n \sum_t \chi_{[\tilde{I}_{SS}(n+1,t)<A, \tilde{I}_{SS}(n,t)<A]}(|\tilde{I}_{SS}(n+1, t) - \tilde{I}_{SS}(n, t)|). \quad (8)$$

where $A=\max(I_{SS})^*\mu$, with $\mu \leq 1$, is a threshold value for the amplitude of the coefficients of $\tilde{I}_{SS}$. The coefficients whose amplitude is above A are not taken into account for the measurement of the lateral continuity, because they are considered to be located on areas of very high variability, for which the constraint of lateral regularity is no longer justified. μ is typically equal to ½ or ⅓.

The optimization of the size S of the window W aims at choosing the largest possible value of S for which $$L(\bar{I}_{SS}) < T = \frac{N * \max(I_{SS})}{\lambda} \quad (9)$$

where T is a threshold that represents the maximum acceptable lateral variability. N is the number of samples of the 2D image $I_{SS}$. T is proportional to the maximum amplitude max ($I_{SS}$) of the coefficients in $I_{SS}$ multiplied by the number N of samples. In the software module of a preferred implementation of the embodiment, the value of T is actually specified by the parameter λ.

Numerical experiments have been run on the wedge-plug model, the Cyclone dataset, as well as a further dataset ('the Rum dataset'). The same default value for λ has been used for the three datasets, wherein this default value had been chosen using a fourth dataset. This means that the numerical experiments have been run without any user intervention on the choice of any of the parameters. The resulting window sizes S for the three datasets were respectively equal to 0.6 s for the wedge-plug model, 0.72 s for the Rum dataset, and 2.1 s for the Cyclone dataset. The resulting 2D images of impedance coefficients for the Rum and Cyclone datasets are shown in FIGS. 12(a) and 12(b), and FIGS. 13(a) and 13(b).

Figure 12A:
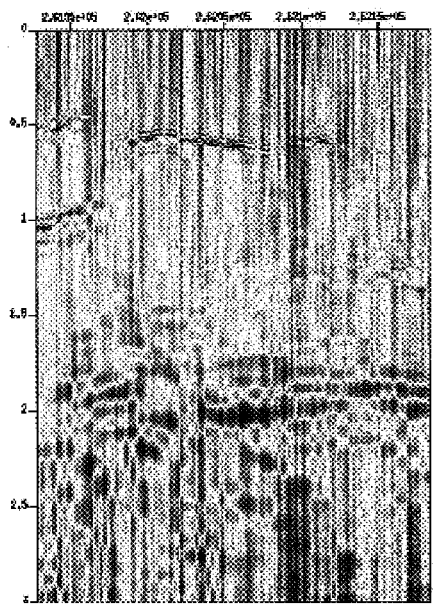
FIG. 12(a) is a 2D plot of impedance coefficients obtained for a dataset ('the Rum dataset') by integration of reflection coefficients computed from a sparse spike inversion with no processing.
Figure 12B:
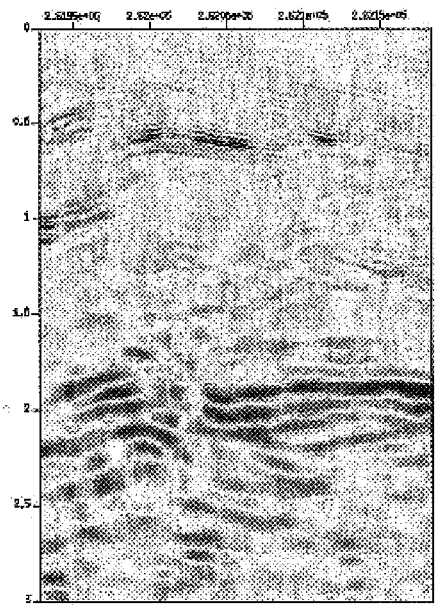
FIG. 12(b) is a corresponding plot using a low frequency triangle window filter having an automatically computed support size, in accordance with an embodiment of the invention.

FIG. 12(a) shows impedance coefficients for the Rum dataset (full stack, inline 2527, crossline 5300 to 5810) obtained with an integration of reflection coefficients computed using a sparse spike inversion, and no further processing, and FIG. 12(b) shows the result of low frequency triangle window filtering where the support size S=0.72 s of the window has been automatically computed using lateral variability, with all parameters set to default.

Figure 13A:
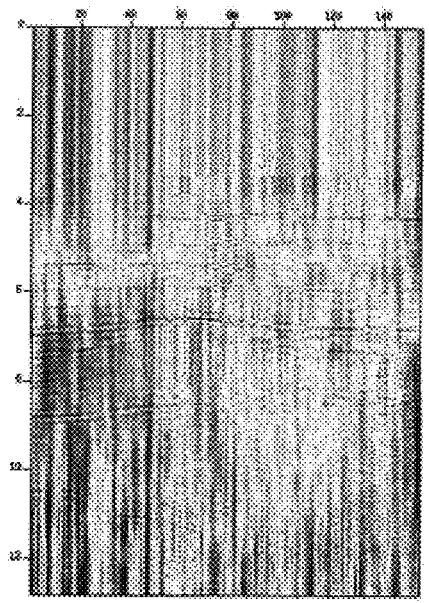
FIGS. 13(a) and 13(b) are corresponding plots to FIGS. 12(a) and 12(b), obtained for the Cyclone dataset.
Figure 13B:
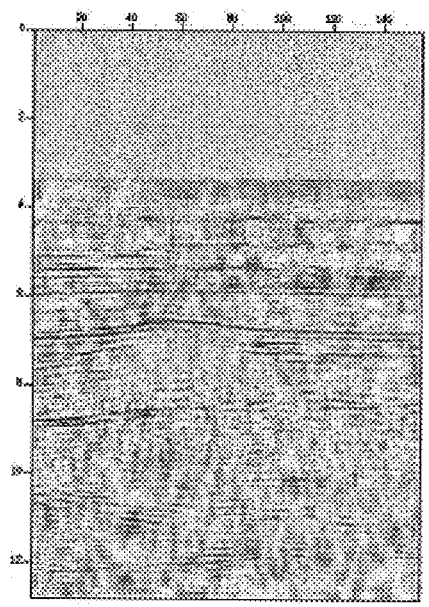

FIG. 13(a) shows impedance coefficients for the Cyclone dataset (crossline 18488, inline 11323 to 11631) obtained with an integration of reflection coefficients computed using a sparse spike inversion, and no further processing, and FIG. 13(b) shows the result of low frequency triangle window filtering where the support size S=2.1 s of the window has been automatically computed using lateral variability, with all parameters set to default.

These results show that the automated size adaptivity procedure in accordance with this embodiment provides results which are not very far from the results obtained "by hand" after an extensive user optimization.

Figure 16:
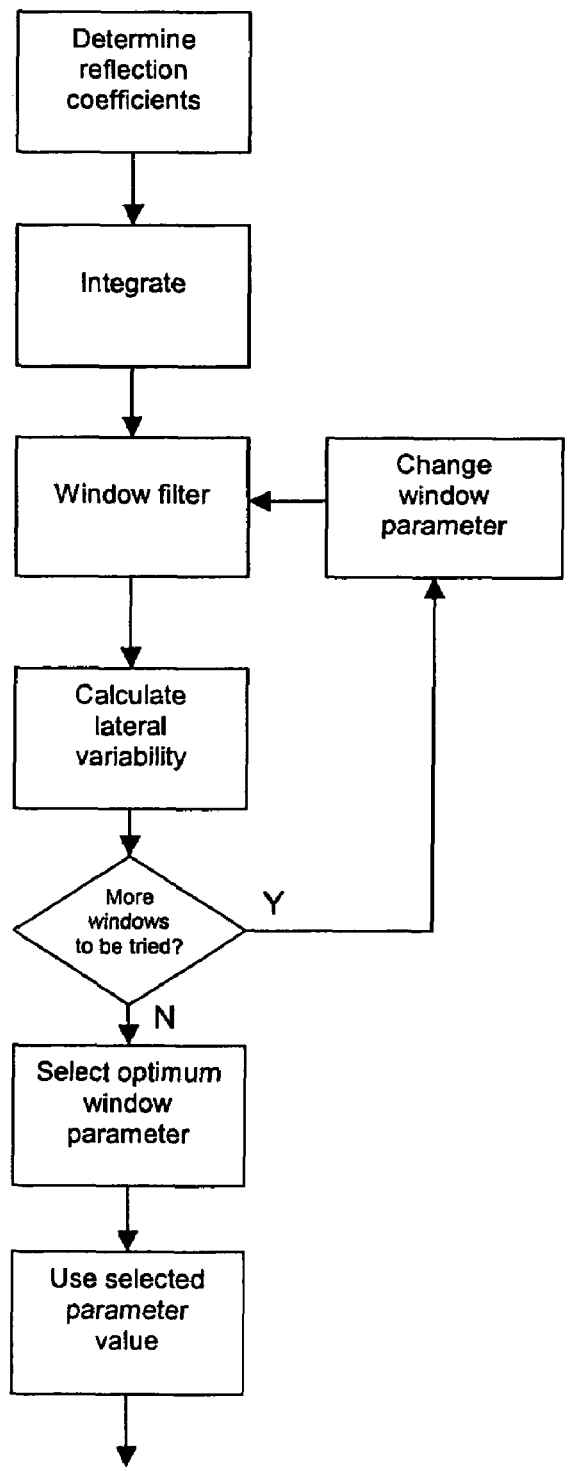
FIG. 16 is a flow chart illustrating the optimisation of the window filter in another embodiment.

The flow chart of FIG. 16 illustrates this embodiment schematically. Reflection coefficients of a plurality of seismic traces across a region are determined, integrated with respect to time to obtain impedance coefficients, and then filtered by applying a low-cut window filter. These steps may be carried out sequentially for each trace, or in parallel for a number of traces.

The window filter has at least one variable window parameter defining the size and/or shape of the window. A lateral variability parameter is then calculated, which represents the variability of the filtered impedance coefficients between seismic traces, and the value of the window parameter is then changed, the impedance coefficients filtered using the modified window filter, and the lateral variability of the resulting filtered impedance coefficients again calculated. By repeating the process of modifying the window and calculating the corresponding variability parameter for the resulting impedance coefficients in each case, the effectiveness of each particular filter can be determined.

Once a particular range of values has been tested for the window parameter, a value of this parameter is selected based on the calculated values of the lateral variability parameter, and the selected window parameter value is then used for other traces in the region.

There may be more than one variable window parameter, and the same principle of selecting values for these parameters on the basis of the resulting lateral variability in the filtered impedance coefficients for different combinations of the window parameter values, can be used in that case.

The at least one variable window parameter may include the support size of the window, and the selection of a value for the window parameter on the basis of the lateral variability may comprise the selection of a maximum value of the support size for which the measured lateral variability parameter remains below a predetermined threshold. This ensures that the amount of filtering is minimised, while still achieving sufficient suppression of artefacts.

Filtered impedance coefficients above a particular threshold value may be excluded from the calculation of the lateral variability parameter, in order to exclude areas of high variability of the actual impedance coefficients from the assessment of the effectiveness of the filter, and this threshold value may be set as a predetermined proportion of the maximum value of the impedance coefficients obtained before filtering.

Finally, it should also be noticed that, when the dataset is a 3D volume (inline*crossline*time) as is practically always the case, the automated optimization of the size of the window can be computed once and for all from the first 2D slice of the volume, but it can also be optimized independently for each 2D slice of the 3D volume, which would be too long and tedious to do by hand. This is particularly useful when the nature of the data (size of strata, types of singularities, etc) varies significantly across the volume. In this case there is a gain in being able to adapt the filtering of the low frequencies across the dataset.

In a further embodiment, when modelling a subsurface region using a plurality of seismic traces from across the region, the seismic traces may be divided into a plurality of sets of adjacent seismic traces, and the steps of FIG. 16 carried out for a first set of the seismic traces, in order to select and use an optimum value of at least one variable window parameter for the window filtering, and the optimally filtered impedance coefficients used in modelling the corresponding portion of the subsurface region. The same steps may then be repeated for the or each remaining set of seismic traces in the region, in order to optimise the window filter for each set.

Figure 17:
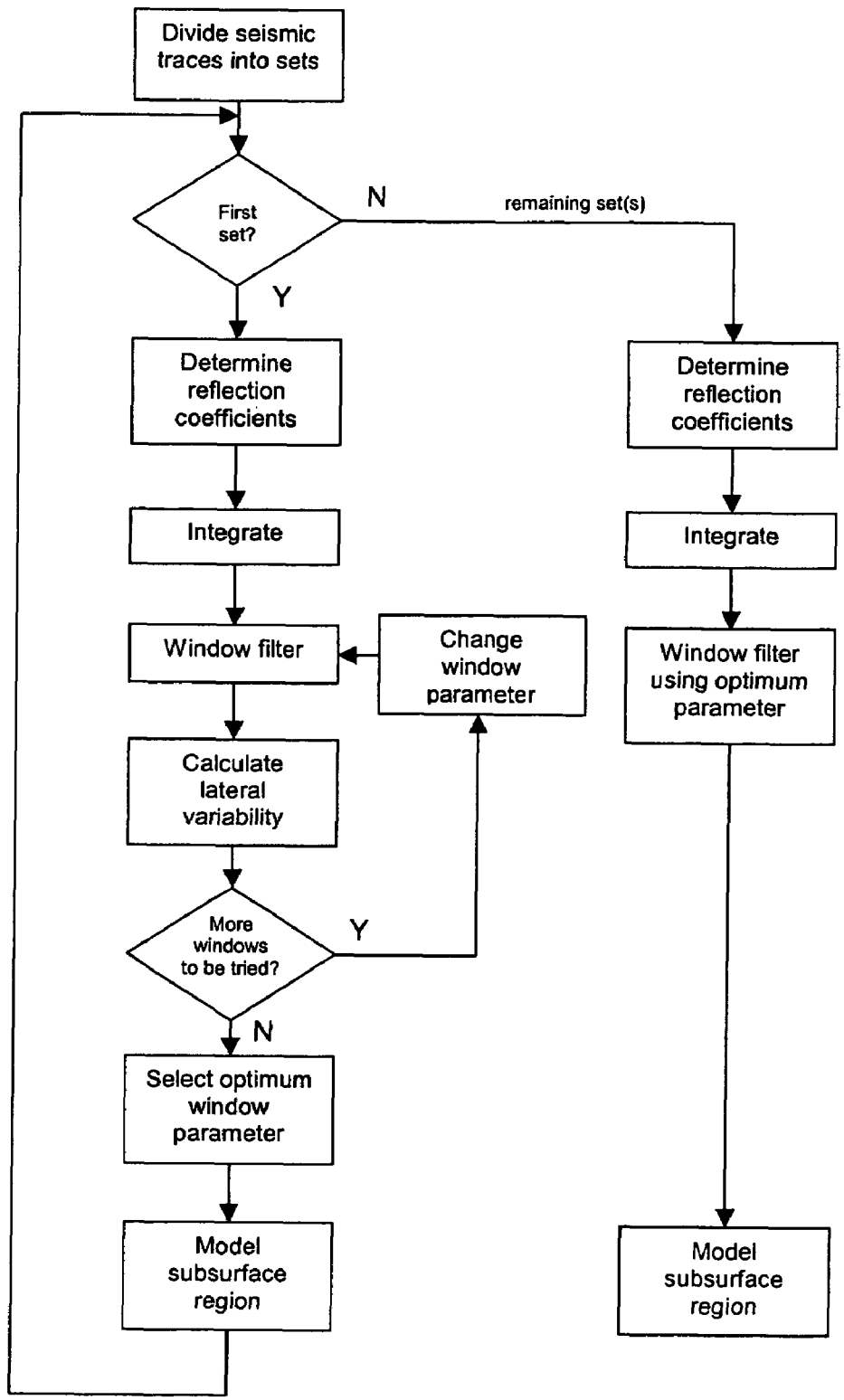
FIG. 17 is a flow chart illustrating the modelling of a subsurface region in a further embodiment, by optimising the window for a first set of seismic traces and using the optimised window for other traces in the region.

Alternatively, the optimised window filter corresponding to the parameter value, or values, obtained in respect of the first set of traces can be used for the remaining set or sets of seismic traces in the region, as shown in FIG. 17. In this case, once the filter has been optimised for the first set of traces, the same filter is used for the remaining set(s), and the remainder of the subsurface region modelled accordingly.

It should be noted that the above described methods may be implemented in the form of a computer program which processes the required input data by carrying out the described method steps. In particular, such a program may operate on seismic inversion data obtained using known seismic inversion procedures in order to provide the reflection coefficients of the seismic trace.

The above describes particular preferred embodiments of the invention. However, modifications may be made within the scope of the claims. In particular, it should be noted that method steps specified in the claims may be carried out in a different order, where the input of one step does not directly require the output of the previous step, and in particular the processing of data relating to different seismic traces may take place either sequentially or in parallel.

Appendix: Parameters Used in Example Software Module Implementation

Seismic Unix module

The low-frequency window filtering described in the foregoing has been implemented as a Seismic Unix module.

The module is self-documented, and the documentation is reproduced below and illustrates examples of parameters which may be used in a software implementation of the method:

The module attenuates low frequencies using a sliding window designed to improve the quantitative and perceptual properties of impedance coefficients. The width of the window can be automatically estimated using a lateral regularity criterion, or hand tuned.

If lateral regularity is used, data should be sorted in accordance with the preferred direction (inline/ep or crossline/cdp) of regularity.

Optional parameters:

| | |
|---|---|
| autowidth = 0 | =0 if lateral continuity should not be used. In that case the window's width if user-specified. If autowidth = 1, the input data should be a file. |
| nline = | Necessary when autowidth = 1. Number of different inlines or crosslines. This is the number of traces used to generate the 2D image on which the lateral continuity will be computed. |
| optifirst = 1 | Used with autowidth = 1. =1 if the window's width is computed once and for all after an optimization on the first 2D line of the dataset. =0 if it is recomputed for each 2D line. |
| latcont = 30 | Integer parameter, used with autowidth = 1. Measure of desired lateral continuity. The larger, the more continuous (and the shorter the window). |
| width = 1 | Width of window (in secs). Ignored if autowidth = 1. |
| dt = from header | sampling interval. |
| verbose = 1 | =0 to stop advisory messages |

The integer parameter latcont is the parameter $\lambda$ of equation (9). It is inversely proportional to the threshold value T which represents the maximum acceptable lateral variability.

The invention claimed is:

1. A method for determining improved impedance coefficients of a seismic trace, the method comprising the steps of:
   determining reflection coefficients of the seismic trace;
   integrating the reflection coefficients with respect to time, to obtain impedance coefficients; and
   filtering the impedance coefficients by applying a low-cut window filter.

2. A method as claimed in claim 1, wherein the reflection coefficients are determined using a sparse spike inversion of the seismic trace.

3. A method as claimed in claim 1, wherein the window size of the filter is defined by a user selectable parameter, and the method further comprises the step of selection of the parameter by the user.

4. A method as claimed in claim 3, wherein only a single window size parameter is selectable by the user.

5. A method as claimed in claim 3, wherein the user selectable parameter is the support size of the window.

6. A method as claimed in claim 1, wherein the window filter comprises a triangular window.

7. A method for determining improved impedance coefficients of a plurality of seismic traces across a region, the method comprising the steps of:
   (a) determining reflection coefficients of each seismic trace;
   (b) integrating the reflection coefficients with respect to time, to obtain impedance coefficients of the plurality of seismic traces across the region;
   (c) filtering the impedance coefficients by applying a low-cut window filter having at least one variable window parameter defining the size and/or shape of the window filter;
   (d) calculating a lateral variability parameter of the filtered impedance coefficients representing the variability of the filtered impedance coefficients between seismic traces;
   (e) repeating steps (c) and (d) using different values of the at least one variable window parameter;
   (f) selecting a value of the at least one variable window parameter based on the lateral variability parameters calculated in step (d); and
   (g) selecting the filtered impedance coefficients obtained in step (c) using the selected value of the at least one variable window parameter.

8. A method as claimed in claim 7, wherein the at least one variable window parameter includes the support size of the window.

9. A method as claimed in claim 8, wherein step (f) comprises selecting a maximum value of the support size of the window for which the measured lateral variability parameter is below a predetermined threshold.

10. A method as claimed in claim 7, wherein filtered impedance coefficients above a threshold value are excluded from the calculation of the lateral variability parameter in step (d).

11. A method as claimed in claim 10, wherein the threshold value is a predetermined proportion of the maximum value of the impedance coefficients obtained in step (b).

12. A method for improving modeling of a subsurface region using a plurality of seismic traces from across the region, the method comprising the steps of:
   (i) dividing the seismic traces into a plurality of sets of adjacent seismic traces;
   (ii) for a first set of seismic traces, carrying out the steps of:
      (a) determining reflection coefficients of each seismic trace in the set;
      (b) integrating the reflection coefficients with respect to time, to obtain impedance coefficients of the plurality of seismic traces of the set;
      (c) filtering the impedance coefficients by applying a low-cut window filter having at least one variable window parameter defining the size and/or shape of the window filter;
      (d) calculating a lateral variability parameter of the filtered impedance coefficients representing the variability of the filtered impedance coefficients between seismic traces of the set;
      (e) repeating steps (c) and (d) using different values of the at least one variable window parameter;
      (f) selecting a value of the at least one variable window parameter based on the lateral variability parameters calculated in step (d); and
      (g) modeling the subsurface region corresponding to the set of seismic traces on the basis of the filtered impedance coefficients obtained in step (c) using the selected value of the at least one variable window parameter.

13. A method as claimed in claim 12, further comprising:
(iii) for each of the remaining sets of seismic traces, carrying out steps (a) to (c) and (g), using the value of the at least one variable window parameter selected in step (f) for the first set of seismic traces.

14. A method as claimed in claim 12, further comprising:
(iii) carrying out steps (a) to (g) for each of the remaining sets of adjacent seismic traces.

15. A computer program product directly loadable into the internal memory of a digital computer, comprising software code portions for performing the method steps of:
determining reflection coefficients of the seismic trace;
integrating the reflection coefficients with respect to time, to obtain impedance coefficients; and
filtering the impedance coefficients by applying a low-cut window filter,
when said product is run on a computer.

16. A computer readable medium on which is recorded a computer program, wherein the program causes the computer to execute the steps of:
determining reflection coefficients of the seismic trace;
integrating the reflection coefficients with respect to time, to obtain impedance coefficients; and
filtering the impedance coefficients by applying a low-cut window filter.

* * * * *